Dec. 5, 1944.  P. VAN S. KOLFF  2,364,256
GENERATOR-VOLTMETER TACHOMETER
Filed Aug. 4, 1941
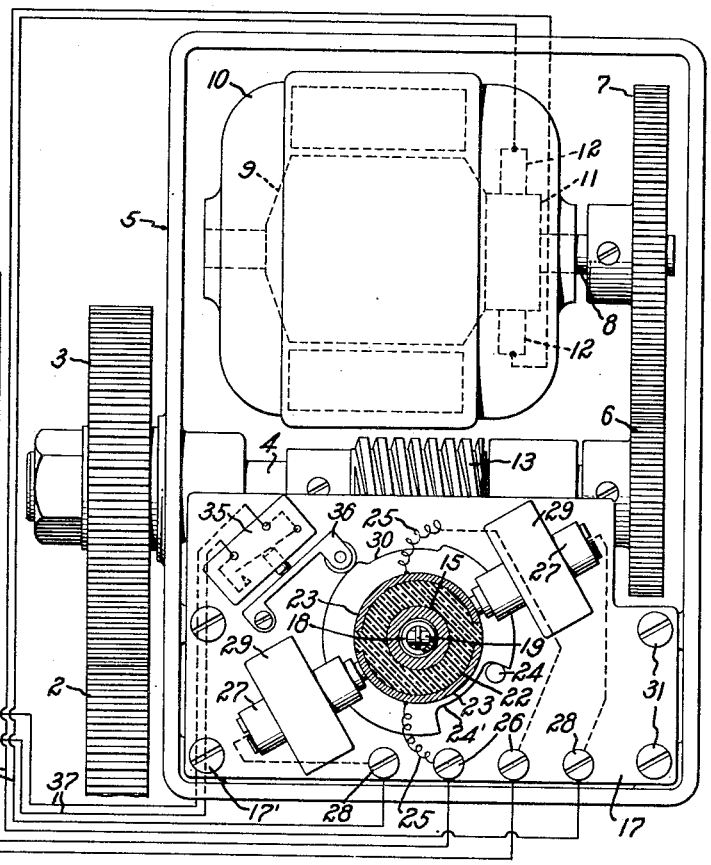
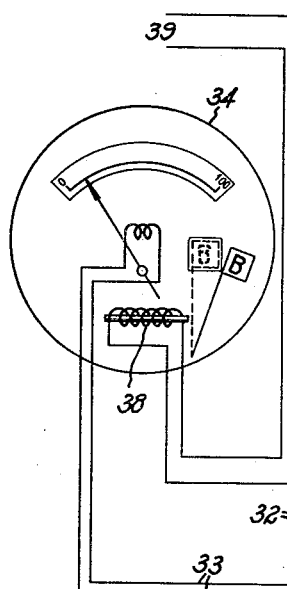
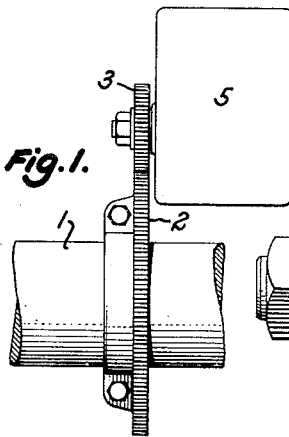
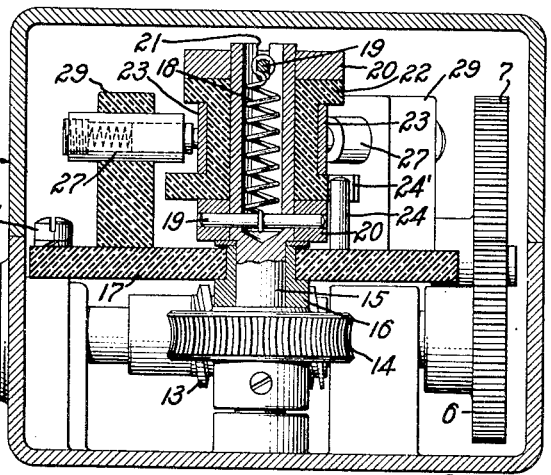
Inventor
Petrus Van Santen Kolff,
By Pierce & Scheffler,
Attorneys.

Patented Dec. 5, 1944

2,364,256

UNITED STATES PATENT OFFICE 2,364,256

GENERATOR-VOLTMETER TACHOMETER

Petrus van Santen Kolff, Harwich Port, Mass., assignor to The Electric Tachometer Corporation, Philadelphia, Pa., a corporation of Delaware Application August 4, 1941, Serial No. 405,453

2 Claims. (Cl. 200—153)

This invention relates to a generator-voltmeter or so-called electric tachometer and more particularly to such apparatus including an automatic reversing switch for obtaining unidirectional readings.

An object of the invention is to provide a simple and inexpensive and at the same time durable and reliable apparatus. The main purpose of the reversing switch is, of course, to double the useful length of the tachometer scale as compared with apparatus in which the tachometer scale has its zero point in the middle and is calibrated on each side to indicate forward and reverse motion. A feature of the invention which is responsible for its success is the provision of speed reducing mechanism between the prime mover, the speed of which is to be measured or indicated, and the reversing switch mechanism in combination with a friction drive for the reversing switch which is durable, certain and practically instantaneous in operation.

The invention will be described and its operation explained in connection with the accompanying drawing, in which, Fig. 1 is a front elevation showing the relationship of the tachometer to the rotating shaft of the prime mover, the speed of which is to be measured and indicated, Fig. 2 is an enlarged front elevation of the tachometer, with the front wall of its casing removed, and the associated indicator and electrical wiring, and Fig. 3 is an elevation with parts in section looking upwardly into the bottom of the instrument as shown in Fig. 2.

In the drawing, the reference numeral 1 identifies the prime mover shaft which carries a gear 2 that meshes with and drives the gear 3 on shaft 4 of the tachometer mechanism in the housing 5. The gear 6 on shaft 4 meshes with the gear 7 on shaft 8 of armature 9 of the electric generator 10. The generator is of the usual direct current type with a commutator 11 and brushes 12 for taking off a direct current voltage that varies with the speed of the armature and reverses polarity upon a reversal of the direction of rotation of the armature. A measurement of the generated voltage thus affords an indication of the main shaft speed.

In accordance with this invention, a polarity reversing switch is operated automatically by the generator driving train to render the direction of current flow to the instrument independent of the direction of rotation of the main shaft. A worm 13 on the shaft 4 meshes with the gear 14 on the switch shaft 15 to drive the latter at a speed that is greatly reduced as compared with the speeds of the prime mover shaft 1 and the armature shaft 8. A bearing 16 for the shaft 15 is carried by a platform 17 of insulating material that is secured to the casing 5 by screws 17'. A coil spring 18 is secured within the upper hollow end of the shaft 15 by pins 19 that extend through and secure upper and lower metal collars 20 to the shaft. The upper pin 19 slides in slots 21 in the shaft 15, and the spring 18 thus draws the upper collar 20 down upon the spool 22 of insulating material which carries the arcuate segments 23 of the reversing switch. The collars 20 frictionally engage and tend to rotate the spool member 22 as the shaft 15 is rotated slowly by the worm 13 and gear 14, but angular movement of the spool 22 is limited by a pin 24 that extends above the platform 17 and into a short recess 24' in the edge of the lower flange of the spool.

Flexible leads 25 extend from the switch segments 23 to binding posts 26 on the platform 17, and the spring pressed brush elements 27 of the reversing switch are connected to another set of binding posts or terminals 28 on the platform. The brush members 27 are supported by pillars 29 that are integral with the insulating platform or, as shown, separate members that are secured to the platform by any appropriate means. The lower flange of the spool member 22 has a second circumferential recess 30 for actuating the switch of a direction-indicating device that will be described hereinafter.

Conductors 32 extend from the brushes 12 of the generator to the binding posts 28 that are connected to the brush contacts 27 of the reversing switch. Leads 33 connect the binding posts 26 to the voltmeter 34 which has a single unidirectional scale graduated in appropriate units of revolutions per minute, miles per hour, or the like. To provide an indication of the direction of rotation of the prime mover shaft 1, a switch 35 is positioned adjacent the lower flange of the switch spool 22 and actuated by a cam roller 36 in cooperation with the recess 30 at the edge of the flange. Leads 37 connect the switch 35 in series with the relay 38 and an independent source of current 39, the relay controlling a suitable signal member, such as a vane carrying the letter "B," to display or to conceal the signal member in accordance with the direction of rotation of the main shaft.

The operation of the tachometer is as follows:

The polarity of the direct current voltage developed across the generator brushes 12 depends upon the direction of rotation of the armature 9, but the switch spool 22 is shifted angularly from one end position to the other upon a reversal of the direction of rotation of the main shaft 1 and the tachometer drive shaft 4. The direction of current flow to the speed indicating instrument 34 thus remains fixed and independent of the direction of rotation of the prime mover shaft 1. The cam roller 36 moves into or out of the recess 38 in accordance with the angular displacement of the switch spool 22, and thereby energizes or de-energizes the relay 38 to control the signal member that indicates the direction of rotation of the prime mover shaft 1.

The relatively slow speed drive of the shaft 15 by the worm 13 and worm gear 14 accounts for the long life of the frictional parts, i. e., the collars 20 and the switch spool member 22. The relative frictional movement of these parts may be made as low as desired so as to avoid excessive wear and heating without sacrificing the almost instantaneous response thereof to a reversal of direction of movement of the prime mover. At the same time it will be observed that the worm and worm gear are capable of long continued operation and the reversing switch mechanism is simple, inexpensive and self-adjusting to compensate for wear due to the substantially constant tension of the spring 18 over a considerable range of elongation. Repair or replacement of parts which may become necessary after long continued use is easy and inexpensive.

I claim:

1. In an electric tachometer, a switching mechanism comprising a shaft to be driven by the prime mover whose speed is to be measured, a part of the shaft being tubular, a pair of collars on said shaft, means locking said collars against angular movement with respect to said shaft and supporting said collars for relative movement axially of the shaft, means including a spring within the tubular portion of said shaft urging said collars toward each other, a spool member loose on said shaft between and frictionally engaged by said collars, a reversing switch including a pair of stationary contacts and a cooperating pair of contact segments on said spool member, and stop means limiting the angular displacement of said spool member by said collars.

2. In an electric tachometer, the invention as claimed in claim 1, wherein said switching mechanism includes a switch positioned adjacent said spool member, and said spool member has a cam groove for operating said switch.

PETRUS van SANTEN KOLFF.